Patented Jan. 19, 1954

2,666,775

UNITED STATES PATENT OFFICE 2,666,775

PREPARATION OF ORGANOSILANES BY REACTION OF SILICON WITH ORGANIC HALIDES

Siegfried Nitzsche, Burghausen, Germany, assignor, by mesne assignments, to Wacker-Chemie G. m. b. H., Munich, Germany No Drawing. Application January 23, 1950,
Serial No. 140,157

3 Claims. (Cl. 260—448.2)

This invention relates to the catalytic production of organic compounds of silicon, and it has for its object to provide a novel and improved process for this purpose.

Another object of the invention is to attain more complete uniformity of transformation, and a higher yield, than has heretofore been possible in a process of the above type.

Various other objects and advantages will be apparent as the nature of the invention is more fully disclosed.

It is known to produce organic compounds of silicon by reacting certain gaseous alkyl or aryl compounds with silicon at elevated temperatures in the presence of copper, copper oxide or copper chloride. The process can also be performed in the presence of other chlorine-containing compounds. However, it is very difficult to accomplish this conversion uniformly, and it is also difficult to obtain a satisfactory yield.

I have discovered that it is possible to obtain more uniform conversion and a higher yield by using alloys of silicon with either copper or iron or both which are activated with chlorides of either copper or iron or both. Various methods may be employed for the activation of the silicon alloy with the chloride salt. Thus, the activation may be accomplished either before or during transformation.

Thus, the powdered alloy may be treated with either the salt in the form of a dry powder or in the form of a solution, whereby to produce a paste. When the alloy is activated during the reaction of the silicon with the alkyl or aryl halide, the alloy may be activated by introducing the salt into the reactor with the alkyl or aryl chloride as a dust or the like. This introduction of the activating salt into contact with the silicon by introduction thereof into the reaction vessel may be effected continuously or periodically during the course of the interaction of the silicon with the alkyl or aryl chlorides.

When the alkyl or aryl chloride is reacted with the silicon activated in accordance with the present invention, it is found that the silicon is used up at a higher rate and with beneficial uniformity of conversion.

Example 1

First a powdered alloy of silicon or ferrosilicon is prepared, and this is treated with a mixture of copper or iron halides, for example copper and iron chloride either in the form of a dry powder, a solution, or a paste. The catalyst is suitably dried in a preheater of the transformation vessel, advantageously at a temperature below the temperature of formation of the organic silicon compound, in general at 160–200° C. Thereupon, a mixture of hydrochloric acid and methyl chloride is conducted at a temperature of, for example, 340° C., over the said material in the reaction vessel, and the corresponding organic compounds of silicon are obtained with a high yield and complete uniformity.

Example 2

An alloy was prepared by melting a mixture containing about 70 to 80 per cent ferrosilicon of 90 per cent silicon content with from 30 to 20 per cent of copper. This alloy was pulverized and the powder treated with a solution of copper in hydrochloric acid which contained some copper of bivalent form. The wet powder so obtained was then dried. The powder was placed in a reactor, into which methyl chloride was introduced with the reactor temperature maintained at about 270° to 300° C. The effluent from the reactor was condensed. After twenty-one hours the condensed effluent contained 380 grams boiling up to 42° C., 2.4 kilograms of dimethyldichlorosilane, and 2.17 kilograms of methyltrichlorosilane. The total condensate was obtained in amount of 6.69 kilograms from an original load of 2.1 kilograms of silicon. At the end of said twenty-one hours, 5 per cent of hydrochloric acid was introduced into the methyl chloride being fed to the reactor. This mixture was introduced into the reactor for the next succeeding five hours at a somewhat higher temperature. A further kilogram of raw product was obtained, which consisted mostly of methylchlorosilanes.

Example 3

An alloy containing 70 per cent of silicon and 30 per cent of copper was prepared and activated as in Example 2. Improved yields over known methods were obtained employing this activated alloy catalyst, though the yields were not as good as obtained in Example 2.

The invention claimed is:

1. The method of preparing alkylchlorosilanes comprising effecting reaction at an elevated temperature between an alkyl chloride and the silicon component of an alloy of silicon and copper in the presence of a preformed copper chloride.

2. The method of claim 1 in which the alkyl chloride is methyl chloride.

3. The method of preparing organochlorosilanes which comprises effecting reaction at an elevated temperature between an organic chloride selected from the group consisting of alkyl and aryl chlorides, and the silicon component of an alloy of silicon and copper in the presence of a preformed copper chloride.

SIEGFRIED NITZSCHE.

References Cited in the file of this patent

UNITED STATES PATENTS

| Number | Name | Date |
|---|---|---|
| 2,447,873 | Rochow | Aug. 24, 1948 |
| 2,488,487 | Barry | Nov. 15, 1949 |
| 2,532,430 | Strothers et al. | Dec. 5, 1950 |
| 2,579,341 | Schwenker | Dec. 18, 1951 |